United States Patent
Price

(10) Patent No.: US 7,036,033 B1
(45) Date of Patent: Apr. 25, 2006

(54) DISK ENCLOSURE WITH MULTIPLEXERS FOR CONNECTING I2C BUSES IN MULTIPLE POWER DOMAINS

(75) Inventor: William Joshua Price, Boulder Creek, CA (US)

(73) Assignee: 3PARdata, Inc., Fremont, CA (US)

(*) Notice: Subject to any disclaimer, the term of this patent is extended or adjusted under 35 U.S.C. 154(b) by 754 days.

(21) Appl. No.: 09/754,903

(22) Filed: Jan. 4, 2001

(51) Int. Cl.
   *G06F 1/00* (2006.01)
(52) U.S. Cl. ............... 713/340; 713/330; 710/316; 710/305
(58) Field of Classification Search ........ 710/305–306, 710/311–316, 317, 2, 300–304, 104, 105, 710/107, 330–340, 323, 320; 713/330–340, 713/323, 320
   See application file for complete search history.

(56) References Cited

U.S. PATENT DOCUMENTS

| | | | | |
|---|---|---|---|---|
| 4,220,876 A * | 9/1980 | Ray | ............................ | 327/594 |
| 5,422,915 A * | 6/1995 | Byers et al. | ................ | 375/357 |
| 5,664,089 A * | 9/1997 | Byers et al. | .................... | 714/1 |
| 5,668,417 A * | 9/1997 | Wiscombe et al. | ........... | 307/64 |
| 5,754,804 A * | 5/1998 | Cheselka et al. | ........... | 710/305 |
| 5,774,684 A * | 6/1998 | Haines et al. | ................ | 710/305 |
| 5,892,933 A * | 4/1999 | Voltz | ........................... | 710/311 |
| 5,935,233 A * | 8/1999 | Jeddeloh | ..................... | 710/306 |
| 6,000,042 A * | 12/1999 | Henrie | ......................... | 714/40 |
| 6,182,178 B1 * | 1/2001 | Kelley et al. | ............... | 710/306 |
| 6,199,130 B1 * | 3/2001 | Berglund et al. | ........... | 710/302 |
| 6,233,635 B1 * | 5/2001 | Son | ............................. | 710/306 |
| 6,260,079 B1 * | 7/2001 | White | ........................... | 710/8 |
| 6,260,093 B1 * | 7/2001 | Gehman et al. | ............ | 710/306 |
| 6,338,108 B1 * | 1/2002 | Neal et al. | .................. | 710/103 |
| 6,351,819 B1 * | 2/2002 | Berglund et al. | ........... | 713/310 |
| 6,625,736 B1 * | 9/2003 | Berthaud et al. | ........... | 713/300 |

OTHER PUBLICATIONS

"2-wire Serial EEPROM", downloaded Oct. 17, 2000 from <http://www.atmel.com/atmel/postscript/first_page/doc0180a.gif>, Atmel® (2000).
"2×5 SFF Transceiver Modules", Finisar (2000).
"LM75 Digital Temperature Sensor and Thermal watchdog with Two-Wire Interface", National Semiconductor Corporation (2000).
"PCF8574 Remote 8-bit I/O expander for I²C-bus" Data Sheet, Philips Semiconductors (1997).
"SN74CBT3253 Dual 1-Of-4 FET Multiplexer/Demultiplexer", Texas Instruments (2000).
"SN74HC4066 Quadruple Bilateral Analog Switch", Texas Instruments (1997).

(Continued)

*Primary Examiner*—Rehana Perveen
*Assistant Examiner*—Raymond N Phan
(74) *Attorney, Agent, or Firm*—Patent Law Group LLP; David C. Hsia

(57) ABSTRACT

A disk enclosure includes a first plurality of I2C elements powered by a first power domain and a second plurality of I2C devices powered by a second power domain. The first plurality of I2C elements are coupled via a first I2C bus and the second plurality of I2C elements are coupled via a second I2C bus. An enclosure controller has a third I2C bus selectively coupled via a multiplexer to the first or the second I2C bus.

9 Claims, 12 Drawing Sheets

OTHER PUBLICATIONS

"SN74AHC1G04 Single Inverter Gate", Texas Instruments (2000).
"Advanced Product Information VSC7127/VSC7129" Vitesse Semiconductor Corporation (2000).
"Advanced Product Information VSC7128", Vitesse Semiconductor Corporation (1998).
"Advanced Product Information VSC7130", Vitesse Semiconductor Corporation (2000).
"Preliminary Data Sheet VSC7132", Vitesse Semiconductor Corporation (2000).
"SSC100 FC-AL Embedded Controller Product Brief" Vitesse Semiconductor Corporation (2000).

* cited by examiner

DISK ENCLOSURE WITH MULTIPLEXERS FOR CONNECTING I2C BUSES IN MULTIPLE POWER DOMAINS

CROSS-REFERENCE TO RELATED APPLICATIONS

This application is related to application Ser. No. 09/754,903, filed Jan. 4, 2001, entitled "ISOLATION OF I2C BUSES IN A MULTIPLE POWER DOMAIN ENVIRONMENT USING SWITCHES," and application Ser. No. 09/755,285, filed Jan. 4, 2001, entitled "DISK ENCLOSURE WITH MULTIPLE POWER DOMAINS," which are commonly owned and incorporated by reference herein in their entirety.

BACKGROUND

1. Field of the Invention

The present invention relates to storage area networks (SANs) and more specifically to the isolation of inter-integrated circuit buses (I2C buses) in a multiple power domain environment.

2. Description of Related Art

In a SAN environment, storage devices such as digital linear tapes (DLTs) and redundant array of independent disks (RAID arrays) are connected to many kinds of servers via a high-speed interconnection such as Fibre Channel. Standard for Fibre Channel was developed by the American National Standards Institute (ANSI) in the early 1990s specifically as a means to transfer large amounts of data very fast. The Fibre Channel standard can be used for copper cabling or fiber-optic cable at distances of up to 10 kilometers.

In a typical situation, SANs based on the Fibre Channel standard may be initially implemented as a group of server systems and storage devices connected by Fibre Channel adapters to a network. As the SAN grows, hubs and switches can be incorporated. The Fibre Channel standard supports several configurations including point-to-point and switched topologies. In a SAN environment, the Fibre Channel Arbitrated Loop (FC-AL) is used most often to create this high-speed storage network due to its inherent ability to deliver any-to-any connectivity among storage devices and servers. A FC-AL configuration consists of several components including servers, storage devices, and a Fibre Channel switch or hub.

The FC-AL provides not only a high-speed interconnection among storage devices but also strong reliability. In fact, several devices can be removed from the loop without any interruption to the data flow. Also, packets sent over a FC-AL are error-checked and packets can be re-transmitted if any are lost or corrupted. More information regarding SANs and Fibre Channel is provided in an article entitled "Storage Area Networks" from NetworkMagazine.com, the entirety of which is incorporated herein.

RAID arrays and JBODs are housed in disk enclosures. Disk enclosures are devices used to house disk drives. Devices within disk enclosures (e.g., repeaters, enclosure controllers, backplane controllers, memory devices, temperature sensors, port bypass circuits, disk drives, power supplies, and fans) can share an I2C bus to communicate with each other. A problem that may occur is that one of the devices may lose power, thus causing the electrostatic discharge (ESD) diode on its I2C pin to become forward biased to ground. This grounds the I2C bus. When the shared I2C bus is grounded, the other devices cannot communicate with each other even though they remain operational. Thus, what is needed is a disk enclosure that allows other devices to communicate with each other via the I2C bus when one device loses power.

SUMMARY

A disk enclosure includes (1) a first bus coupled to a first plurality of elements powered by a first power domain, (2) a second bus coupled to a second plurality of elements powered by a second power domain, (3) a first controller coupled to a third bus, and (4) a first multiplexer (mux) operable to selectively couple the first or the second bus to the third bus so the first controller can communicate with the first or the second plurality of elements. If the first bus is grounded because of a failure of one of the first plurality of elements or the first group of power supplies, the second bus does not become grounded because the first bus and the second bus are not coupled. Thus, the first controller can continue to communicate with the second plurality of elements via the coupling of the second bus and the third bus by the first mux.

The disk enclosure further includes (1) a fourth bus coupled to a third plurality of elements powered by the first power domain, (2) a fifth bus coupled to a fourth plurality of elements powered by the second power domain, (3) a second controller coupled to a sixth bus, and (4) a second mux operable to selectively couple the fourth or the fifth bus to the sixth bus so the second controller can communicate with the third or the fourth plurality of elements. If the fourth or the fifth bus is grounded because of a failure of one of the third or the fourth plurality of elements, the first or the second bus does not become grounded because they are not coupled to the forth or the fifth bus. Thus, the first controller can continue to communicate with the first or the second plurality of elements even when the second controller cannot communicate with the third or the fourth plurality of elements because the fourth or the fifth bus is grounded.

BRIEF DESCRIPTION OF THE DRAWINGS

Use of the same reference symbols in different drawings indicates similar or identical items.

DETAILED DESCRIPTION

Figure 1:
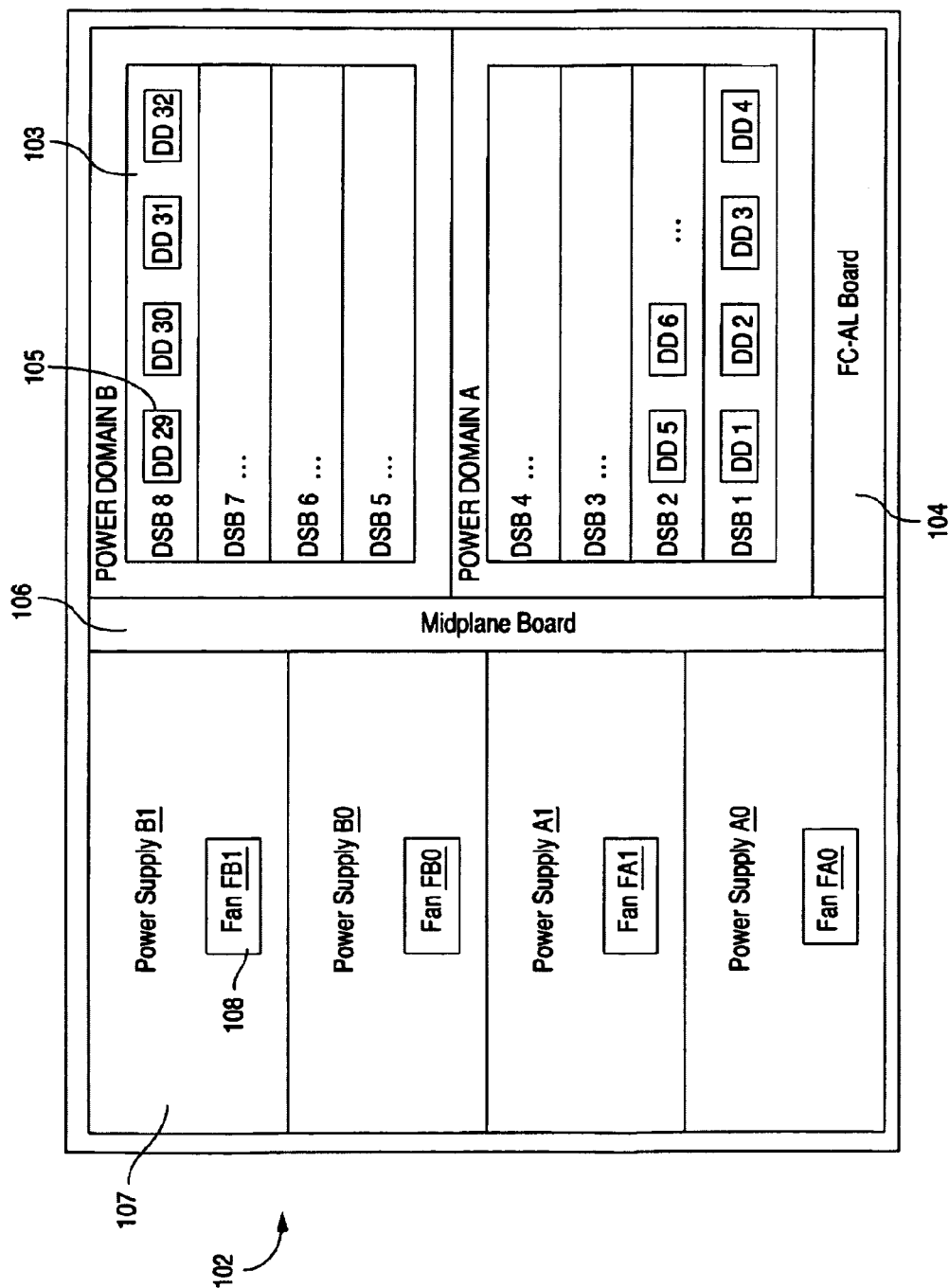
FIG. 1 is a block diagram of the layout of a disk enclosure, according to an embodiment of the present invention.

FIG. 1 is a block diagram illustrating the layout of a disk enclosure 102, according to one embodiment of the present invention. As depicted, enclosure 102 includes eight disk sled boards 103 (only one of which is provided with a reference numeral for clarity). These disk sled boards 103 are separately labeled as DSB1 to DSB8. Each disk sled board 103 includes four disk drives 105 (only one of which is provided with a reference numeral for clarity). These disk drives are separately labeled as DD1–DD32. DD1 to DD4 are on DSB1, DD5 to DD8 are on DSB2, . . . , and DD29 to DD32 are on DSB8. Each disk sled board includes other devices including backplane controllers, port bypass circuits, temperature sensors, and memory devices (shown and described later in reference to FIG. 4). It should be understood, of course, that the number of disk sled boards 103 and disk drives 105 can be varied.

A number of power supplies 107 (separately labeled as power supply A0, power supply A1, power supply B0 and power supply B1) provide power for disk sled boards 103. In one embodiment, power supplies A0 and A1 may be conventionally current-shared to provide n+1 redundancy; power supplies B0 and B1 may be conventionally current-shared to provide n+1 redundancy. Power supplies A0 and A1, along with any corresponding backup batteries (described later) may provide or implement a first power domain (power domain A). Power supplies B0 and B1, along with any corresponding back batteries (described later) may provide or implement a second power domain (power domain B).

In this embodiment, disk enclosure 102 may operate in a split power mode where DSB1 to DSB4 are powered by power supplies A0 and A1 (e.g., via one or more power lines from current-shared power supplies A0 and A1, through the midplane board 106, and onto DSB1 to DSB4), and DSB5 to DSB8 are powered by power supplies B0 and B1 (e.g., via one or more power lines running from current-shared power supplies B0 and B1, through the midplane board 106, and onto DSB5 to DSB8). Accordingly, DSB1 to DSB4 are accessible (operational) if either power supply A0 or A1 is present (operational), and DSB5 to DSB8 are accessible (operational) if either power supply B0 or B1 is present (operational). In this embodiment, DSB1 to DSB4 may be considered to be located in power domain A because they are powered by current-shared power supplies A0 and A1, and DSB5 to DSB8 may be considered to be located in power domain B because they are powered by current-shared power supplies B0 and B1. In other embodiments, disk enclosure 102 may operate in a single power mode where DSB1 to DSB8 are accessible (operational) if any one of power supplies A0, A1, B0, and B1 is present (operational). In these embodiments, a connector couples the outputs of power domain A (current shared power supplies A0 and A1) and power domain B (current shared power supplies B0 and B1) to supply a single power to elements of disk enclosure 102.

Power supplies A0, A1, B0, and B1 each include a separate cooling fan 108 (only one of which is provided with a reference numeral for clarity). These are separately labeled as FA0, FA1, FB0, and FB1, respectively. Power supplies A0, A1, B0, and B1 are, for example, HF-171s from Acme Electric of Cuba, N.Y. It should be understood, of course, that the number of power supplies can be varied to provide greater or lesser redundancy, and each of the power supplies can include multiple fans.

A Fibre Channel-Arbitrated Loop (FC-AL) board 104 functions to support one or more FC-ALs which provide connectivity for disk enclosure 102. FC-AL board 104 may include transceivers, repeaters, enclosure management controllers, and memory devices (shown and described later in reference to FIG. 4). In some embodiments (shown and described later in reference to FIGS. 4 and 5), elements on FC-AL board 104 are accessible (operational) if any one of power supplies A0, A1, B0, and B1 is present (operational). In these embodiments, elements on FC-AL board 104 are powered by a diode ORed and fused voltage (a shared voltage) derived from power domains A and B.

A midplane board 106 functions to distribute the Fibre Channel loop to the disk sled boards. Midplane board 106 may include multiplexers, port bypass circuits, backplane controllers, temperature sensors, memory devices, and I2C I/O expanders (shown and described later in reference to FIG. 4). In some embodiments (shown and described later in reference to FIGS. 4 and 5), elements on midplane board 106 are accessible (operational) if any one of power supplies A0, A1, B0, and B1 is present (operational). In these embodiments, elements on midplane board 106 are powered by a diode ORed and fused voltage (a shared voltage) derived from power domains A and B.

Figure 2A:
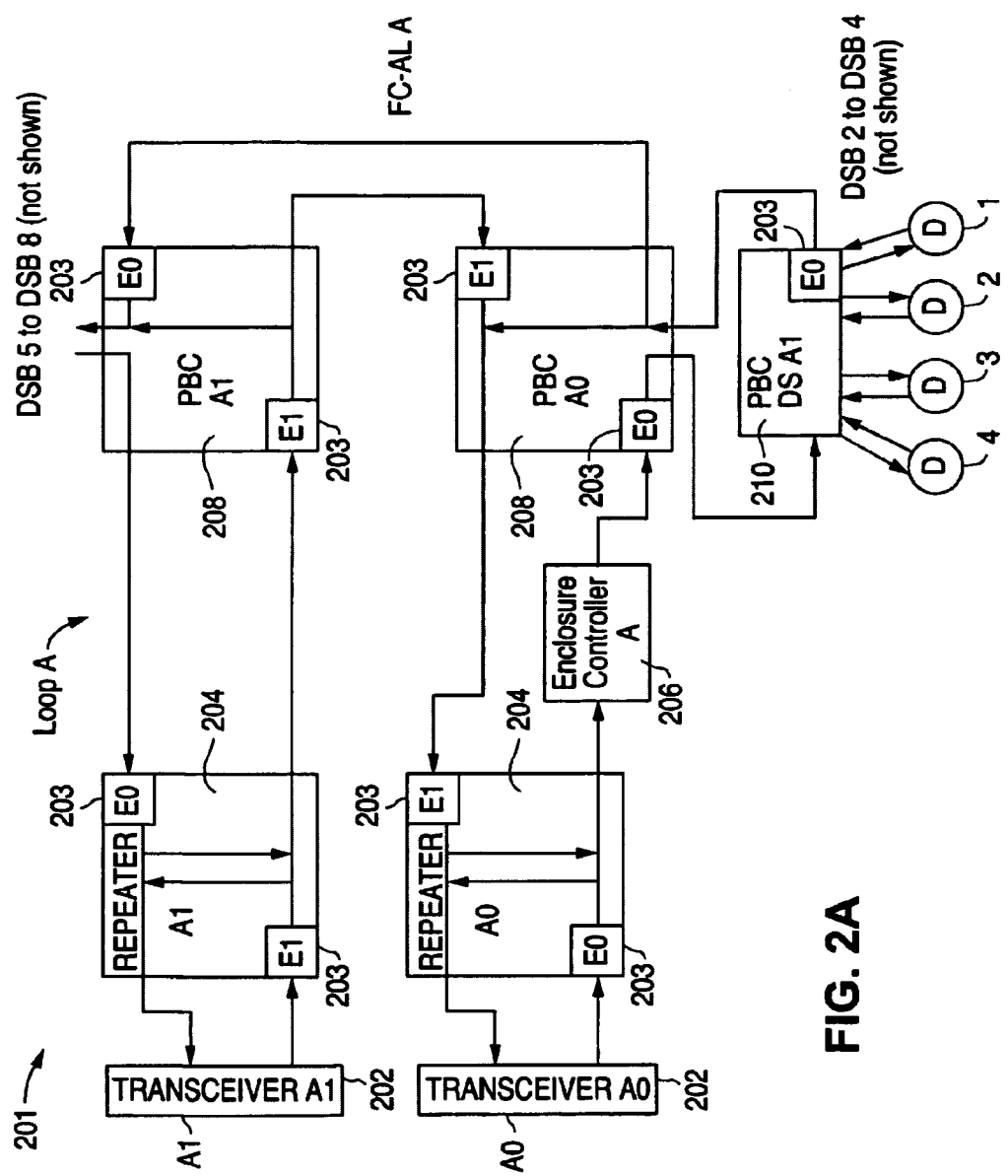
FIGS. 2A and 2B are block diagrams of Fibre-Channel Arbitrated Loops (FC-ALs) within the disk enclosure of FIG. 1, according to embodiments of the present invention.
Figure 2B:
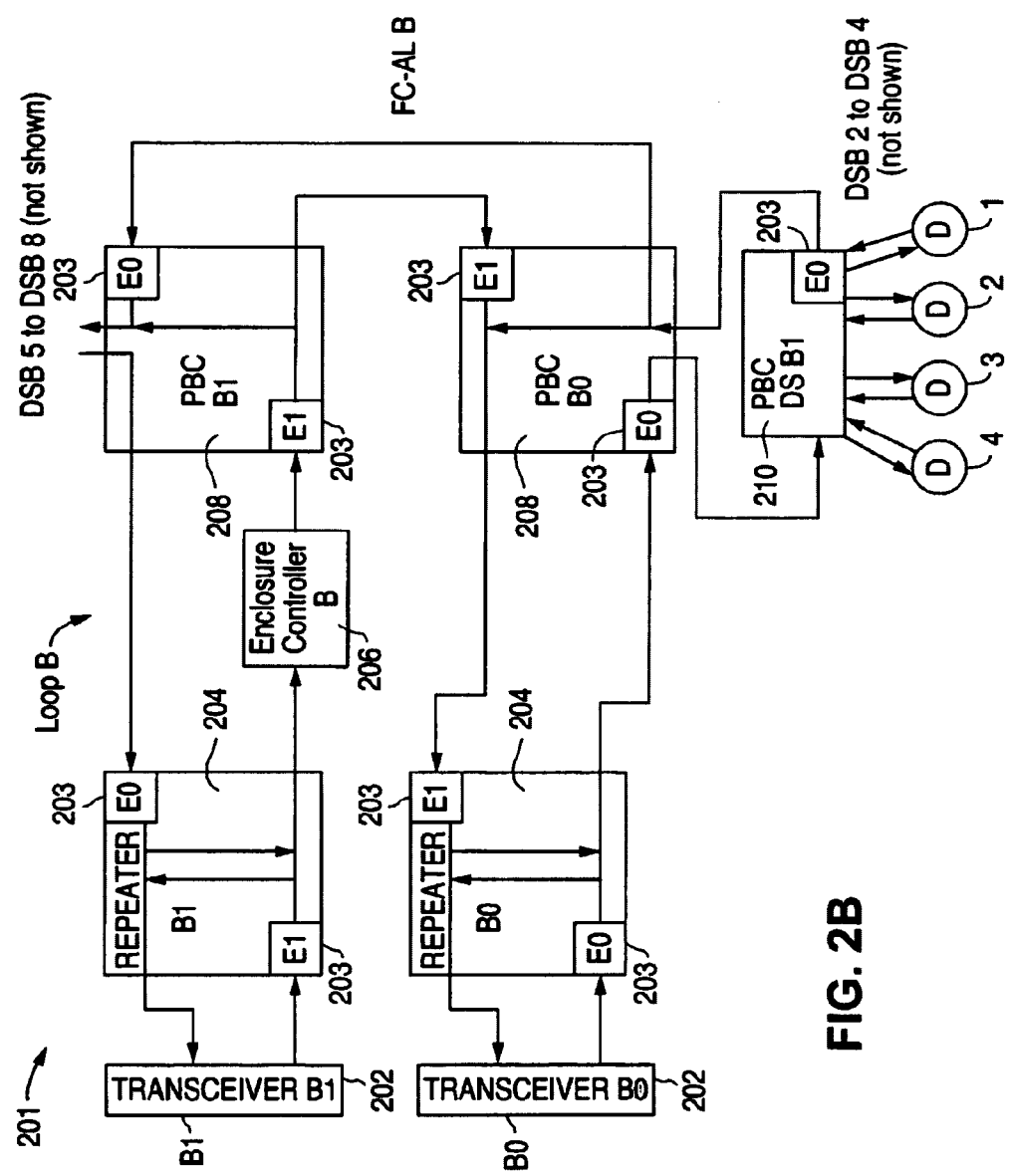

FIGS. 2A and 2B are block diagrams illustrating two FC-ALs 201 (separately labeled as Loop A and Loop B) through a disk enclosure 102, according to embodiments of the present invention. Two FC-ALs 201 are provided within disk enclosure 102 for redundancy so that the devices within disk enclosure 102 may still communicate in the event that one of the FC-ALs should fail. Data may be transmitted in the loops A and B in 8B/10B transmission code. As one skilled in the art understands, 8B/10B transmission code is used to provide DC balance of the transmitted bit stream; to separate transmitted control bytes from the data bytes; to simplify bit, byte, and word alignment; and to provide a mechanism for detecting transmission and reception errors.

In one embodiment of Loop A, a first transceiver 202 (labeled transceiver A0) receives optical signals from another device in the loop A. Transceiver A0 is, for example, a FTRJ-8519 Transceiver Module from Finisar Corp. of Sunnyvale, Calif. Transceiver A0 converts the optical signals to electrical signals and transmits the electrical signals to a first repeater 204 (labeled repeater A0). Repeater A0 is, for example, a VSC7130 Dual Repeater/Retimer from Vitesse Semiconductor Corp. of Camarillo, Calif. Repeater A0 regenerates the electrical signals to meet industrial standard signal quality specifications and transmits the regenerated electrical signals to an enclosure controller 206 (labeled enclosure controller A). Repeater A0 includes an error detect unit 203 (labeled as E0—e.g., a signal detect unit in VSC7130) that conventionally tests for valid Fibre Channel data by detecting (1) analog signal amplitude errors, (2) run length errors, and (3) absences of synchronization character (e.g., K28.5) in regular time intervals. An analog signal amplitude error occurs when the electrical signal swings are of inadequate amplitude. A run length error occurs when the data has more than five consecutive zeros or ones because valid 8B/10B transmission codes do not have more than five consecutive zeros or ones. The absence of the synchronization character, such as, for example, a K28.5 character, is an error because such a character regularly appears in the Fibre Channel data as a means to synchronize the data for decoding. These and other types of errors in Fibre Channel are further described in "Fibre Channel Physical and Signaling Interface (FC-PH)" (ANSI X3.230-1994) by the American National Standard for Information Systems, which is incorporated by reference in its entirety.

Enclosure controller A is, for example, a SSC100 FC-AL Embedded Controller from Vitesse Semiconductor Corp. Enclosure controller A transmits the electrical signals to a port bypass circuit 208 (labeled PBC A0). PBC A0 is, for example, a VSC7128 Hex Port Bypass Circuit/Dual Repeater from Vitesse Corp. PBC A0 regenerates the electrical signals to meet industrial standard signal quality specifications and transmits the regenerated electrical signals to other elements (e.g., one or more of DSB1 to DSB4). PBC A0 also includes an error detect unit 203 that tests for valid Fibre Channel data.

PBC A0 is used to bypass any of DSB1 to DSB4. For example, it may be necessary to bypass one or more disk sled boards that are generating errors in loop A in order to hot remove and replace these disk sled boards. Similarly, it may be desirable to improve performance (e.g., reduce latency and increase throughput) by bypassing one or more disk sled boards from loop A and then use loop B to access these disk sled boards. Accordingly, PBC A0 selectively transmits the regenerated electrical signals through other port bypass circuits associated with respective disk sled boards. As shown, these other port bypass circuits include a port bypass circuit 210 (labeled as PBC DS A1).

Port bypass circuits 210 are, for example, VSC7127 Repeaters/Retimers and Port Bypass Circuits from Vitesse Corp. Whereas port bypass circuits 208 are used to bypass disk sled boards, port bypass circuits 210 are each associated with a respective disk sled board and are used to bypass any of the four disk drives located on their respective disk sled boards. For example, it may be necessary to bypass one or more disk drives that are generating errors in loop A in order to hot remove and replace these disk drives. Similarly, it may be desirable to improve performance (e.g., reduce latency and increase throughput) by bypassing one or more disk drives from loop A and use loop B to access these disk drives. Accordingly, each of port bypass circuits 210 selectively transmits the electrical signals through the four disk drives located on their disk sled boards. For example, PBC DS A1 selectively transmits the electrical signals through disk drives 1 to 4. After receiving the electrical signals back from the last disk drive, each of port bypass circuits 210 regenerates the electrical signals to meet industrial standard signal quality specifications and transmits the regenerated electrical signals to PBC A0. Each of port bypass circuits 210 also includes a respective error detect unit 203 that tests for valid Fibre Channel data. After receiving the electrical signals back from the last port bypass circuit 210, PBC A0 transmits the electrical signals to another port bypass circuit 208 (labeled PBC A1).

Like PBC A0, PBC A1 regenerates the electrical signals to meet industrial standard signal quality specifications and transmits the regenerated electrical signals to other elements (e.g., one or more of DSB5 to DSB8). PBC A1 also includes an error detect unit 203 that tests for valid Fibre Channel data. Accordingly, PBC A1 selectively transmits the regenerated electrical signals through a separate port bypass circuit 210 on each of DSB5 through DSB8. For clarity, these other port bypass circuits 210 are not illustrated in FIG. 2A.

Each of the port bypass circuits 210 for DSB5 through DSB8 are used to bypass any of the four disk drives located on their respective disk sled boards if necessary. Accordingly, each of these port bypass circuits 210 selectively transmits the electrical signals through the four disk drives located on their respective disk sled boards. For example, the port bypass circuit 210 for DSB5 selectively transmits the electrical signals through respective disk drives DD17 to DD20. After receiving the electrical signals back from the last disk drive, each of port bypass circuits 210 regenerates the electrical signals to meet industrial standard signal quality specifications and transmits the regenerated electrical signals to PBC A1. Each of these port bypass circuits 210 also includes an error detect unit 203 that tests for valid Fibre Channel data. After receiving the electrical signals back from the last port bypass circuit 210, PBC A1 transmits the electrical signals to a repeater 204 (labeled as repeater A1).

Repeater A1 regenerates the electrical signals and transmits the regenerated electrical signals to a transceiver 202 (labeled as transceiver A1). Repeater A1 includes an error detect unit 203 that tests for valid Fibre Channel data. Transceiver A1 converts the electrical signals to optical signals and passes the optical signals to another device in the FC-AL. Return signals can travel similarly through loop A in the reverse order. As illustrated in FIG. 2A, each of repeater A1, PBC A1, PBC A0, and repeater A0 includes an error detect unit 203 (labeled as E1) that tests for valid Fibre Channel data in the return signals.

As one skilled in the art understands, either repeater A0 or A1 can act as an end of loop A where the electrical signals are routed back through loop A in the reverse order. Furthermore, loop A can be split into two loops where PBC A0 acts as the end of a first loop and PBC A1 acts as the end of a second loop.

FIG. 2B illustrates an embodiment of loop B. Loop B is a duplicate of loop A, shown and described in reference to FIG. 2A. Corresponding elements in loops B and A have the same reference numeral but for the inclusion of a letter "B" to indicate an element of loop B and the inclusion of a letter "A" to indicate an element of loop A. For example, repeaters B1 and A1 are corresponding elements. In some embodiments, loop A is used to write data to the disk drives on DSB1 to DSB4 and loop B is used to write data to the disk drives on DSB5 to DSB8. If either loop A or B fails, the other loop can be used to access DSB1 to DSB8. Of course, disk drive access between loops A and B can be varied.

Figure 3A:
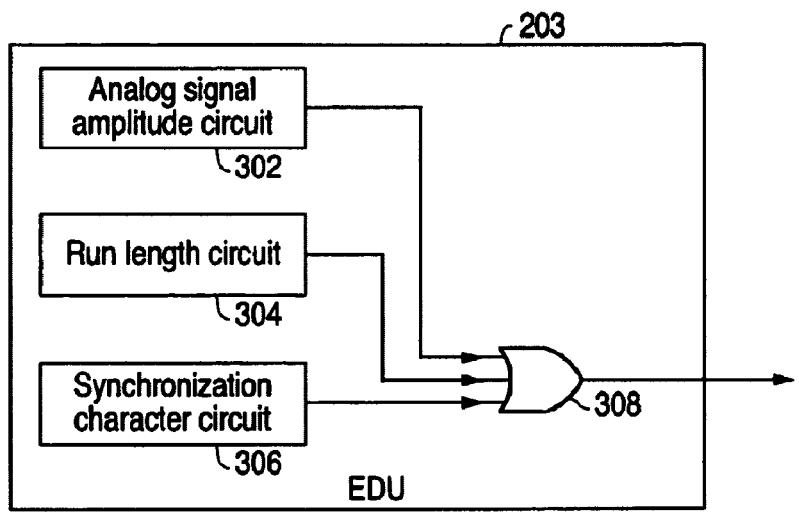
FIGS. 3A and 3B are block diagrams of error detect units in the FC-ALs in FIGS. 2A and 2B, according to embodiments of the present invention.

FIG. 3A is a block diagram of one embodiment for an error detect unit 203. As shown, error detect unit 203 includes an analog signal amplitude circuit 302 that detects analog signal amplitude errors, a run length circuit 304 that detects run length errors, and a synchronization character circuit 306 that detects the absence of synchronization (e.g., K28.5) characters. Each of circuits 302, 304, and 306 outputs an active signal to an OR gate 308 if it detects its type of error. OR gate 308 outputs an active signal to indicate that the current Fibre Channel data is invalid (e.g., a real-time error). Error detect unit 203 is, for example, the signal detect unit in VSC7127, VSC7128, and VSC7130 Repeaters/Retrievers from Vitesse Corp. Of course, error detect unit 203 can alternatively output individual active signals from circuits 302, 304, and 306 to specifically identify the type of error detected.

Figure 3B:
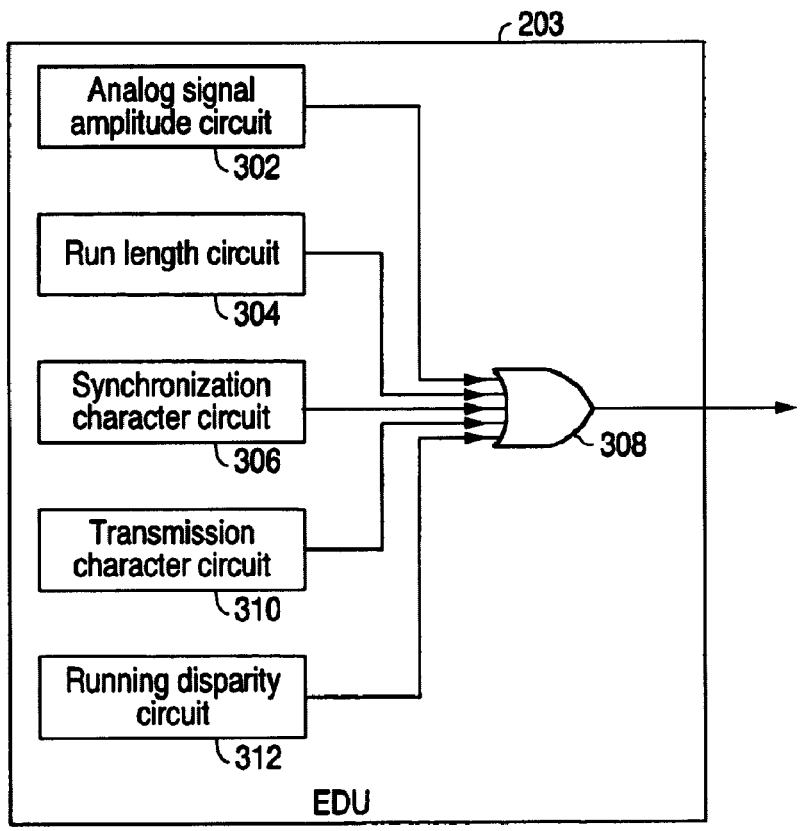

FIG. 3B is a block diagram of another embodiment for an error detect unit 203. As shown, this embodiment includes an analog signal amplitude circuit 302, a run length circuit 304, and a synchronization character circuit 306, similar to those described in reference to FIG. 3A. In addition, this embodiment of error detect unit 203 of FIG. 3B includes a transmission character circuit 310 that detects transmission character errors and a running disparity circuit 312 that detects running disparity errors. 8B/10B transmission coding encodes 8 bits of data into a 10-bit transmission character. A transmission character error occurs when a transmission character is invalid because it cannot be decoded to 8 bits of data. A running disparity is the disparity between the number of 1s and 0s transmitted. Every 8 bits of data to be transmitted has two corresponding transmission characters, one with five or six 1s and the other with five or four 1s. In 8B/10B transmission coding, a sending device keeps track of the running disparity and selects the transmission character that keeps the running disparity as close to zero as possible. A running disparity error occurs when a receiving device detects that the running disparity has strayed from zero.

Figure 3C:
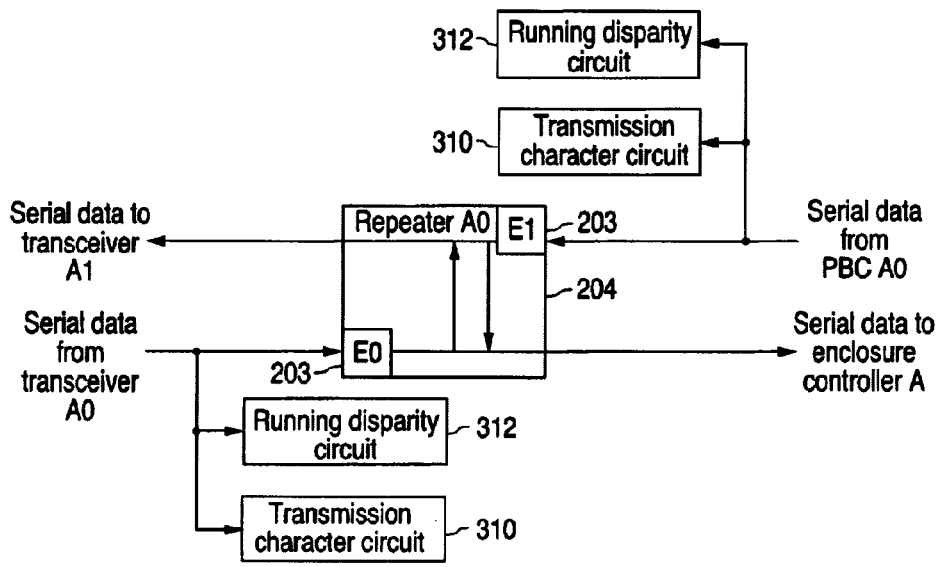
FIGS. 3C and 3D are block diagrams of error detect units separate from repeaters and port bypass circuits, according to embodiments of the present invention.
Figure 3D:
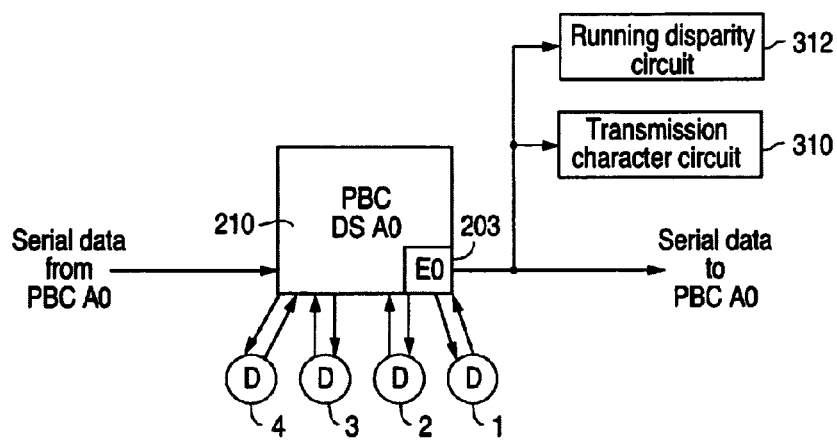

FIGS. 3C and 3D are block diagrams of embodiments having running disparity circuit 310 and transmission character circuit 312 as discrete integrated circuits separate from error detect units 203 in parts of loop A. In FIG. 3C, serial data into repeater 204 is received in parallel by discrete circuits 310 and 312. In FIG. 3D, serial data out of PBC 210 is received in parallel by discrete circuits 310, 312, and PBC 208. As one skilled in the art understands, a link replicator can be used to duplicate and buffer the data from the FC-AL for the discrete circuits 310 and 312. The link replicator is, for example, a VSC7132 Link Replicator from Vitesse Corp.

Running disparity circuit 310 and transmission character circuit 312 can be implemented in a variety of ways. For example, transmission character circuit 312 can be implemented with a logic that compares the transmission characters received with valid transmission characters stored in a memory device. Alternatively, running disparity circuit 310 can be implemented with a logic that keeps track of the difference between the number of 1s and 0s in the transmission characters.

Referring again to FIG. 3B, each of circuits 302, 304, 306, 310, and 312 outputs an active signal to OR gate 308 if it detects its respective error. OR gate 308 outputs an active signal, which is the output signal for error detect unit 203, to indicate that the current Fibre Channel data is invalid (e.g., a real-time error). Of course, error detect unit 203 can alternatively output individual active signals from circuits 302, 304, 306, 310, and 312 to specifically identify the type of error detected.

Error detect units 203 on repeaters 204 and port bypass circuits 208 are used to isolate an element that is generating transmission errors in loop A or loop B. By including circuits 310 and 312 in or along with error detect units 203, additional types of errors can be detected. The following examples illustrate how error detect units 203 can be used to isolate an element that is generating transmission errors in loop A or loop B.

One example applies to the link between repeater A0 and PBC A0. If error detect unit 203 (E0) of repeater A0 does not detect an error and error detect unit 203 (E0) of PBC A0 detects an error, then enclosure controller A may be generating an error because enclosure controller A is the element located between error detect units 203 of repeater A0 and PBC A0. If enclosure controller A is replaced and the error persists, then the internal circuitry of repeater A0 or PBC A0 may be generating the error. Each of repeater A0 and PBC A0 can be individually replaced to determine which element is causing the error. If the error persists even then, then the circuit boards that house and interconnect repeater A0, enclosure controller A, and PBC A0 may be causing the error. Thus, the circuit boards can be individually replaced to determine which board is causing the error.

Another example applies to the link between PBC A0 and PBC DS A1. If error detect unit 203 (E0) of PBC A0 does not detect an error and error detect unit 203 (E0) of PBC DS A1 detects an error, then one or more of disk drives DD1 to DD4 may be generating the error because these disk drives are the elements between respective error detect units 203 of PCB A0 and PBCC DS A1. To determine which disk DD1 to DD4 is causing the error, disk drives 1 to 4 can be individually placed on the loop to see if the error is detected. If the error persists even after all the disk drives are checked, then the internal circuitry of PBC A0 or PBC DS A1 may be generating the error. Each of PBC A0 and PBC DS A1 can be individually replaced to determine which element is causing the error. If the error persists even then, then the circuit boards that house and interconnect PBC A0, PBC DS A1, and respective disk drives (DD1 TO DD4) may be causing the error. Thus, the circuit boards can be individually replaced to determine which board is causing the error. The above examples can be similarly applied to loop B elements.

Figure 4A:
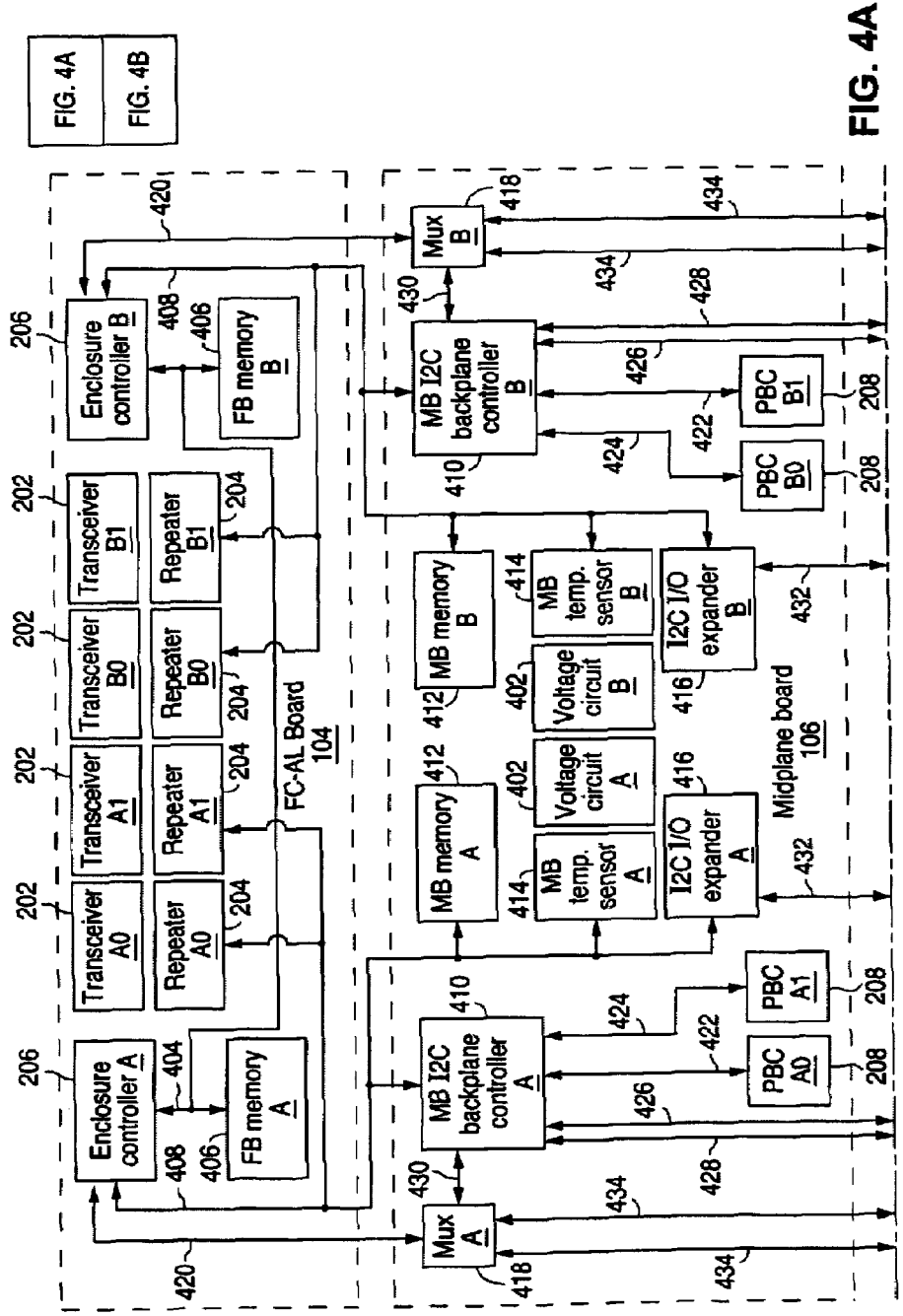
FIG. 4 (comprising of FIGS. 4A and 4B) is a block diagram of a FC-AL board, a midplane board, backup batteries, power supplies, and disk sled boards of the disk enclosure of FIG. 1, according to an embodiment in the present invention.
Figure 4B:
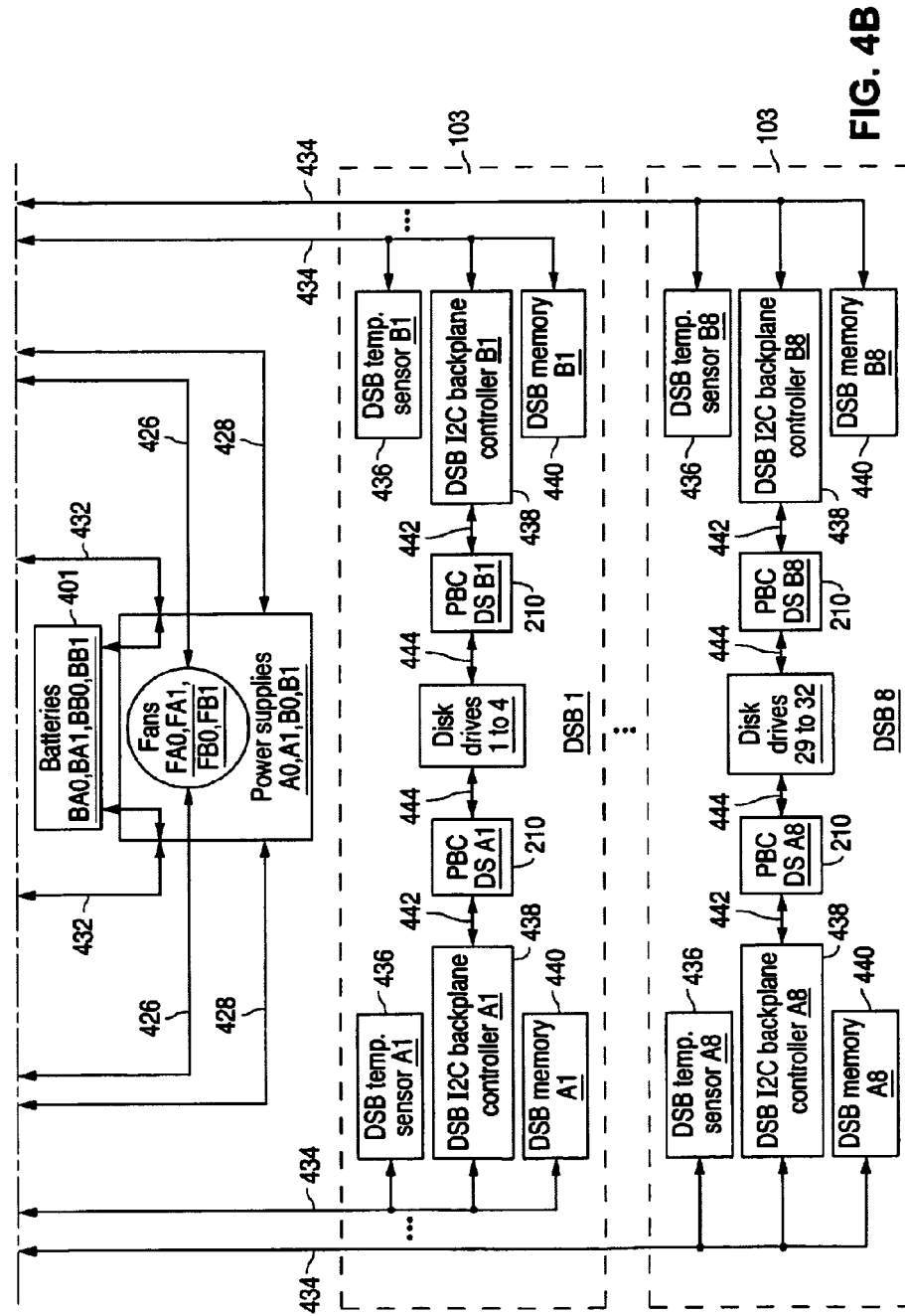

FIG. 4 (comprising of FIGS. 4A and 4B) is a block diagram of FC-AL board 104, midplane board 106, DSB1 to DSB8, power supplies 107 (power supplies A0, A1, B0, and B1) and backup batteries 401 (labeled as BA0, BA1, BB0 AND BB1), according to embodiments of the present invention. Batteries BA0, BA1, BB0, and BB1 are located in an enclosure (not shown) external to disk enclosure 102 in some embodiments. Batteries BA0, BA1, BB0, and BB1 are respectively coupled to power supplies A0, A1, B0, and B1 to provide backup power in case of AC power failures. Power supplies 107 may include chargers (not shown) used to charge their respective batteries 401. Batteries 401 are, for example, RA-17s from ACME Electric. Power supplier A0, A1 and batteries BA0, BA1 cooperate to provide power for power domain A. Power supplier B0, B1 and batteries BB0, BB1 cooperate to provide power for power domain B.

In some embodiments, loop A elements on FC-AL board 104 and midplane board 106 (described herein) are powered by a first voltage circuit 402 (labeled voltage circuit A) located on midplane board 106, and loop B elements on FC-AL board 104 and midplane board 106 are powered by a second voltage circuit (labeled voltage circuit B) located on midplane board 106. Voltage circuits 402 (described later in reference to FIG. 5) respectively provide voltages Vshared-A and Vshared-B derived from power domains A and B. Duplicate voltage circuits 402 are provided so that loop A elements and loop B elements are not disabled by the failure of a single voltage circuit.

Figure 5:
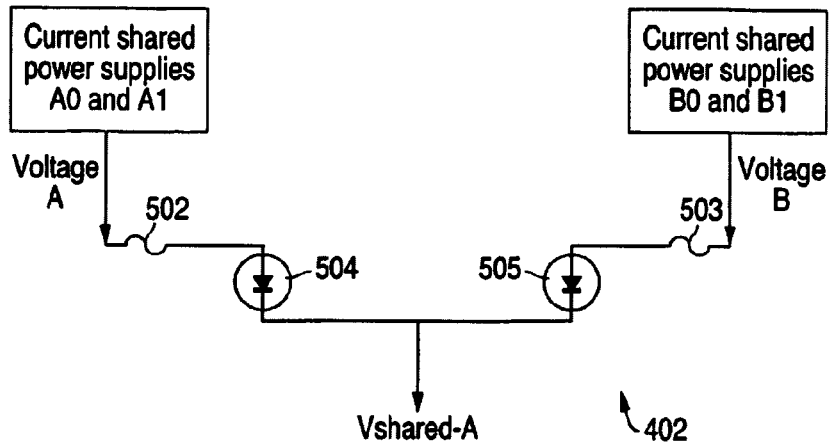
FIG. 5 is a schematic diagram, in partial block form, of a voltage circuit used to power some devices of the FC-AL board and the midplane board of FIG. 4, according to an embodiment in the present invention.

FIG. 5 is a schematic diagram, in partial block form, of voltage circuit 402 used to generate Vshared-A, according to an embodiment of the present invention. Voltage circuit 402 generates a diode ORed and fused voltage derived from power domains A and B. A voltage A from current shared power supplies A0 and A1 is fed via a fuse 502 to a diode 504, and a voltage B from current shared power supplies B0 and B1 is fed via a fuse 503 to a diode 505. Diodes 504 and 505 are coupled to supply voltage Vshared-A to loop A elements on FC-AL board 104 and midplane board 106. Thus, voltage Vshared-A will be maintained if either voltage A or B is supplied. Accordingly, loop A elements on FC-AL board 104 and midplane board 106 remain accessible (operational) if any one of the power supplies A0, A1, B0, and B1 is present (operational). Voltage circuit B is implemented in the same or similar fashion to supply voltage Vshared-B to loop B elements on FC-AL board 104 and midplane board 106.

Referring again to FIG. 4, FC-AL board 104 comprises various loop A elements which, as shown, include enclosure controller A, memory 406 (labeled FB memory A), transceivers A0 and A1, and repeaters A0 and A1. Enclosure controller A monitors and/or controls other loop A elements. FB memory A, which is coupled via an I2C bus 404 to enclosure controller A, stores instructions for enclosure controller A and FC-AL board specific information. FC-AL board specific information includes bytes of data written to FB memory A, byte size of FB memory A, FC-AL board part numbers, revision number, vendor identification, assembly date, serial number, and checksum of the data written to FB memory A. FB memory A may comprise, for example, an AT24C04 Serial EEPROM from Atmel Corporation of San Jose, Calif. Enclosure controller B is also coupled via I2C bus 404 to enclosure controller A. Thus, enclosure controller A can control and/or monitor loop B elements via enclosure controller B, and vice versa.

Enclosure controller A is coupled via an I2C bus 408 to control and/or monitor repeaters A0 and A1. For example, enclosure controller A (1) monitors errors detected by repeaters A0 and A1, (2) monitors the performance of repeaters A0 and A1, and (3) controls whether repeaters A0 and A1 act as the ends of loop A so that the electrical signals are looped back through loop A in the reverse order.

Midplane board 106 includes various loop A elements, such as a backplane controller 410 (labeled MB I2C backplane controller A), a memory 412 (labeled as MB memory A), a temperature sensor 414 (labeled as MB temp. sensor A), an I2C input/output expander 416 (labeled as I2C I/O expander A), a 1-of-8 multiplexer 418 (labeled as Mux A), and PBCs A0 and A1. Enclosure controller A is coupled via I2C bus 408 to control and/or monitor MB I2C backplane controller A, MB memory A, MB temp. sensor A, and I2C I/O expander A. Enclosure controller A uses MB I2C backplane controller A to control and/or monitor (1) PBCs A0 and A1, (2) fans FA0, FA1, FB0, and FB1, and (3) power supplies A0, A1, B0, and B1. MB I2C backplane controller A is, for example, a SSC050 I2C Backplane Controller from Vitesse.

MB I2C backpalne controller A controls and/or monitors PBCs A0 and A1 via respective I/O lines 422 and 424. For example, backplane controller A (1) detects the presence of disk sled boards, (2) enables the bypass of selected disk sled boards, (3) detects real-time errors identified by error detect units of PBCs A0 and A1, and (4) enables the split of loop A by using PBC A0 as the end of a first loop and PBC A1 as the end of a second loop.

In one embodiment, each of PBCs A0 and A1 includes an edge-detecting latch that is set when a real-time error is detected. This latch remains set until it is cleared by MB I2C backplane controller A. In these embodiments, MB I2C backplane controller A also detects and clears latched errors identified by PBCs A0 and A1. MB I2C backplane controller A can use the detection of real-time and latched errors to determine if a part of loop A (e.g., a link) before PBC A0 or A1 is down or has intermittent real-time errors. For example, a link in loop A is down if backplane controller A (1) detects a real-time error and a latched error, (2) clears the latched error, and (3) detects another real-time error but not another latched error. A link in loop A has intermittent errors if backplane controller A (1) detects a latched error, (2) clears the latched error, and (3) detects another latched error.

MB I2C backplane controller A controls and/or monitors fans FA0, FA1, FB0, and FB1 via I/O lines 426. For example, backplane controller A detects the failure of fans FA0, FA1, FB0, and FB1. MB I2C backplane controller A controls and/or monitors power supplies A0, A1, B0, and B1 via I/O lines 428. For example, backplane controller 410 (1) enables the power supplies and (2) detects (a) the presence of the power supplies, (b) the failure of the power supplies, (c) the failure of AC supply to the power supplies, and (d) the overload of the chargers that charge the backup batteries (e.g., excessive charging time due to the number of backup batteries being charged). For clarity, fans FA0, FA1, FB0, and FB1, power supplies A0, A1, B0, and B1, and their I/O lines are not shown individually.

Enclosure controller A accesses MB memory A to read midplane board specific information including bytes of data written to MB memory A, byte size of MB memory A, midplane board part numbers, revision number, vendor identification, assembly date, serial number, and checksum of the data written to MB memory A. MB memory A is, for example, an AT24C08 Serial EEPROM from Atmel. Enclosure controller A accesses MB temp. sensor A to monitor the temperature of midplane board 106. MB temp. sensor A is, for example, a LM75 Digital Temperature Sensor and Thermal Watchdog from National Semiconductor Corporation of Santa Clara, Calif. I2C I/O expander A is coupled via I/O lines 432 to backup batteries BA0, BA1, BA0, and BB1 (through respective power supplies A0, A1, B0, and B1). Enclosure controller A accesses I2C I/O expander A to determine the number of backup batteries present and to test the backup batteries for sufficient charge. I2C I/O expander A is, for example, a PCF8574 from Philips Semiconductor of Netherlands. For clarity, backup batteries BA0, BA1, BA0, and BB1, and their I/O lines are not shown individually.

Enclosure controller A also uses MB I2C backplane controller A to control Mux A on midplane board 106 to selectively couple an I2C bus to loop A elements on DSB1 to DSB8 (described later in reference to FIG. 6). MB I2C backplane controller A controls Mux A via I/O lines 430. Mux A selectively couples I2C bus 420 to one of DSB1 to DSB8. Specifically, Mux A selectively couples I2C bus 420 to one of I2C buses 434. I2C buses 434 are coupled to loop A elements on respective DSB1 to DSB8. Specifically, each I2C bus 434 is coupled to a number of loop A elements of a respective disk sled board, including, for example, temperature sensor 436 (labeled, e.g., DSB temp. sensor A1, A8), I2C backplane controller 438 (labeled, e.g., DSB backplane controller A1, A8), and memory 440 (labeled, e.g., DSB memory A1, A8). For clarity, only a portion of I2C buses 434 and respective disk sled boards are illustrated in FIG. 4.

In one embodiment, temperature sensors 436 are of the same type as the previously described temperature sensor 414, I2C backplane controllers 438 are of the same type as the previously described I2C backplane controller 410, and memories 440 are of the same type as the previously described memory 412 I2C backplane controllers 438 are coupled to respective port bypass circuits 210 (also loop A elements) via respective I/O lines 442. DSB I2C backplane controllers 438 control and/or monitor port bypass circuits 210. For example, DSB backplane controllers 438 (1) enable the bypass of selected disk drives, (2) detect the bypass ready status of the disk drives, (3) detect the presence of the disk drives, (4) detect errors reported by the disk drives, (5)

detect errors and latched errors identified by port bypass circuits 210, (6) clear latched errors detected by port bypass circuits 210, (7) select the operation mode of port bypass circuits 210 (e.g., repeater or retimer mode), and (8) detect the power mode of DSB1 to DSB8 (e.g., split or single power mode). To detect a single power mode, DSB I2C backplane controllers 438 can have an I/O line coupled to the connector that couples the outputs of power domains A and B to supply a single power to disk enclosure 102. Port bypass circuits 210 are coupled to their respective disk drives (e.g., disk drives DD1 to DD4 for PBC DS A1 and disk drives DD29 to DD32 for PBC DS A8) via respective I/O lines 444.

Figure 6:
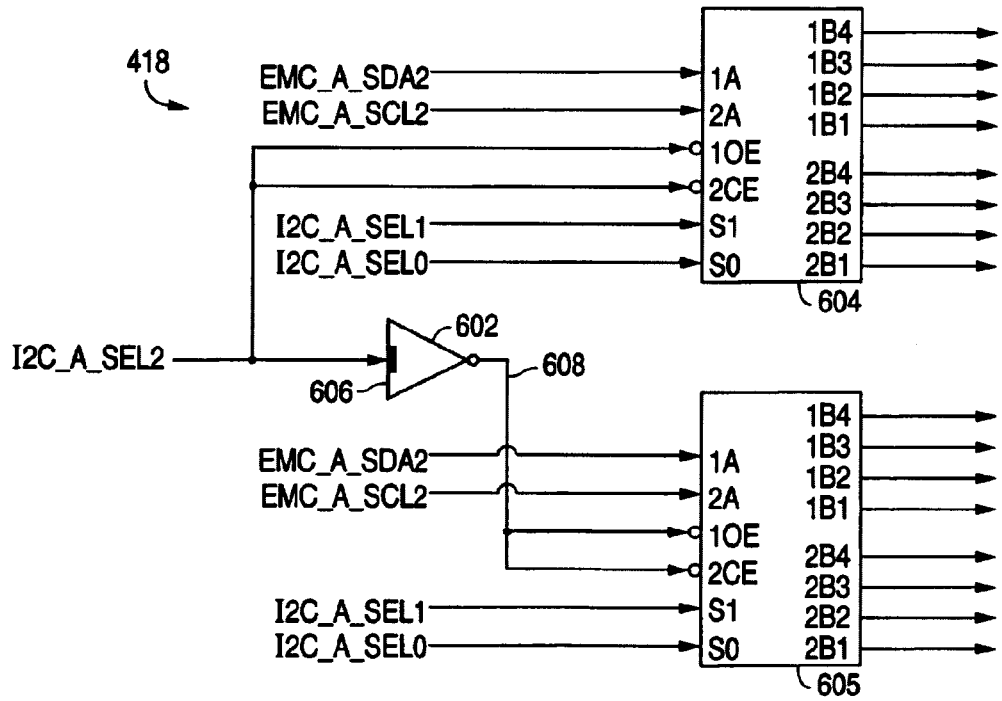
FIG. 6 is a block diagram of a multiplexer of the midplane board of FIG. 4, according to an embodiments of the present invention.

FIG. 6 illustrates an embodiment for mux 418. As shown, mux 418 includes an inverter 602 and 1-of-4 muxes 604 and 605. Inverter 602 has an input terminal 606 coupled to receive a signal I2C_A_SEL2 from one of I/O lines 430 of MB I2C backplane controller A, and an output terminal 608 coupled to an output enable terminal 1OE and a chip enable terminal 2CE of mux 605. Mux 604 has an output enable terminal 1OE and a chip enable terminal 2CE coupled to receive signal I2C_A_SEL2 from one of I/O lines 430. In one embodiment, muxes 604 and 605 are enabled by active low signals on terminals 1OE and 2CE. Thus, mux 604 is enabled by a logic low signal I2C_A_SEL2 and mux 605 is enabled by a logic high signal I2C_A_SEL2.

Each of muxes 604 and 605 has data input terminals 1A and 2A respectively coupled to receive I2C data signal EMC_A_SDA2 and I2C clock signal EMC_A_SCL2 from I2C bus 420 of enclosure controller A. Once enabled, the selected one of muxes 604 and 605 outputs I2C data signal EMC_A_SDA2 and I2C clock signal EMC_A_SCL2 to a pair of output lines (e.g., 1B1 and 2B1) selected by address signals I2C_A_SEL0 and I2C_A_SEL1 received on respective address terminals S0 and S1 from two of I/O lines 430 of MB I2C backplane controller A. Each pair of output lines is coupled to one of I2C buses 434 for respective disk sled boards. For example, output lines 1B1 and 2B1 of mux 604 are coupled to I2C bus 434 for DSB1, and output lines 1B4 and 2B4 of mux 605 are coupled to I2C bus 434 for DSB8. Thus, a three bit address signal from I/O lines 430 of MB I2C backplane controller A (I2C_A_SEL0, I2C_A_SEL1, and I2C_A_SEL2) is used to select one of DSB1 to DSB8 to receive the I2C clock and data signals from I2C bus 420 of enclosure controller A. Table 1 below illustrates an exemplary address scheme for selecting one of DSB1 to DSB8. Inverter 602 is, for example, a SN74AHC1G04 Single Inverter Gate from Texas Instrument of Dallas, Tex., and muxes 604 and 605 are, for example, SN74CBT3253 Dual 1-of-4 FET Multiplexers/Demultiplexers from Texas Instrument.

TABLE 1

| I2C_A_SEL0 | I2C_A_SEL1 | I2C_A_SEL2 | Selected DSB |
|---|---|---|---|
| 1 | 1 | 1 | DSB8 |
| 1 | 1 | 0 | DSB7 |
| 1 | 0 | 1 | DSB6 |
| 1 | 0 | 0 | DSB5 |
| 0 | 1 | 1 | DSB4 |
| 0 | 1 | 0 | DSB3 |
| 0 | 0 | 1 | DSB2 |
| 0 | 0 | 0 | DSB1 |

As can be seen from FIG. 4, loop A elements are duplicated as loop B elements on FC-AL board 104, midplane board 106, and DSB1 to DSB8 in some embodiments. Corresponding loop B elements and loop A elements have the same reference numeral but for the inclusion of a letter "B" to indicate a loop B element and the inclusion of a letter "A" to indicate a loop A element. As described above, loop A elements on FC-AL board 104 and midplane board 106 are powered by Vshared-A, and loop B elements on FC-AL board 104 and midplane board 106 are powered by Vshared-B. Furthermore, DSB 1 to DSB4 are powered by voltage A (e.g., located in power domain A) and DSB5 to DSB8 are powered by voltage B (e.g., located in power domain B) in a split power mode, or DSB1 to DSB8 are powered-by a single power derived from power domains A and B in a single power mode.

As described above, I2C bus 420 is selectively coupled to one of I2C buses 434 via Mux A. Thus, I2C buses 434 are not coupled to each other. When one or more of I2C buses 434 are grounded because of a failure of a loop A element, the other I2C buses are not pulled to ground and can still be used by enclosure controller A to access other loop A elements. For example, I2C buses 434 for DSB2 to DSB8 are not pulled to ground when I2C bus 434 for DSB1 is grounded by a failure of respective DSB temp. sensor 436. Enclosure controller A can cause Mux A to couple I2C bus 420 to any of the other I2C buses 434 to access loop A elements on DSB2 to DSB8. Similarly, I2C buses 434 for DSB1 to DSB4 are not pulled to ground when I2C buses 434 for DSB5 to DSB8 are grounded by a failure of power supplies B0 and B1 (power domain B that powers DSB5 to DSB8 in split power mode). Enclosure controller A can cause Mux A to couple I2C bus 420 to any of the respective I2C buses 434 to access loop A elements on DSB1 to DSB4.

Furthermore, I2C buses 434 for power domain A are not coupled to I2C buses 434 for power domain B. I2C buses 434 for power domain A are isolated from the grounding of I2C buses for power domain B, and vice versa. Thus, either set of I2C buses 434 can be used to access their respective elements on the disk sled boards when the other set of I2C buses 434 fails. For example, I2C buses 434 for power domain B are not pulled to ground when I2C buses 434 for power domain A are grounded because of a failure of power supplies and/or loop A elements. Enclosure controller B can cause Mux B to couple an associated I2C bus 420 to any of I2C buses 434 to access loop B elements on DSB1 to DSB8.

Figure 7A:
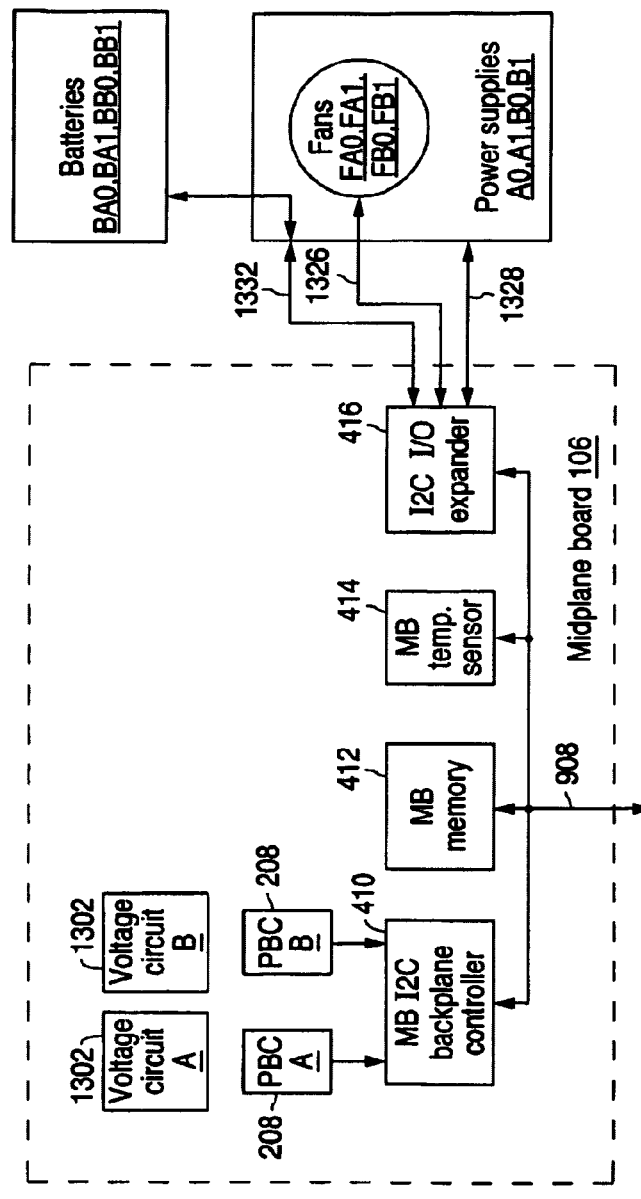
FIG. 7 (comprising of FIGS. 7A, 7B, and 7C) is a block diagram of a FC-AL board, a midplane board, backup batteries, power supplies, and disk sled boards of the disk enclosure of FIG. 1, according to an embodiment in the present invention.
Figure 7B:
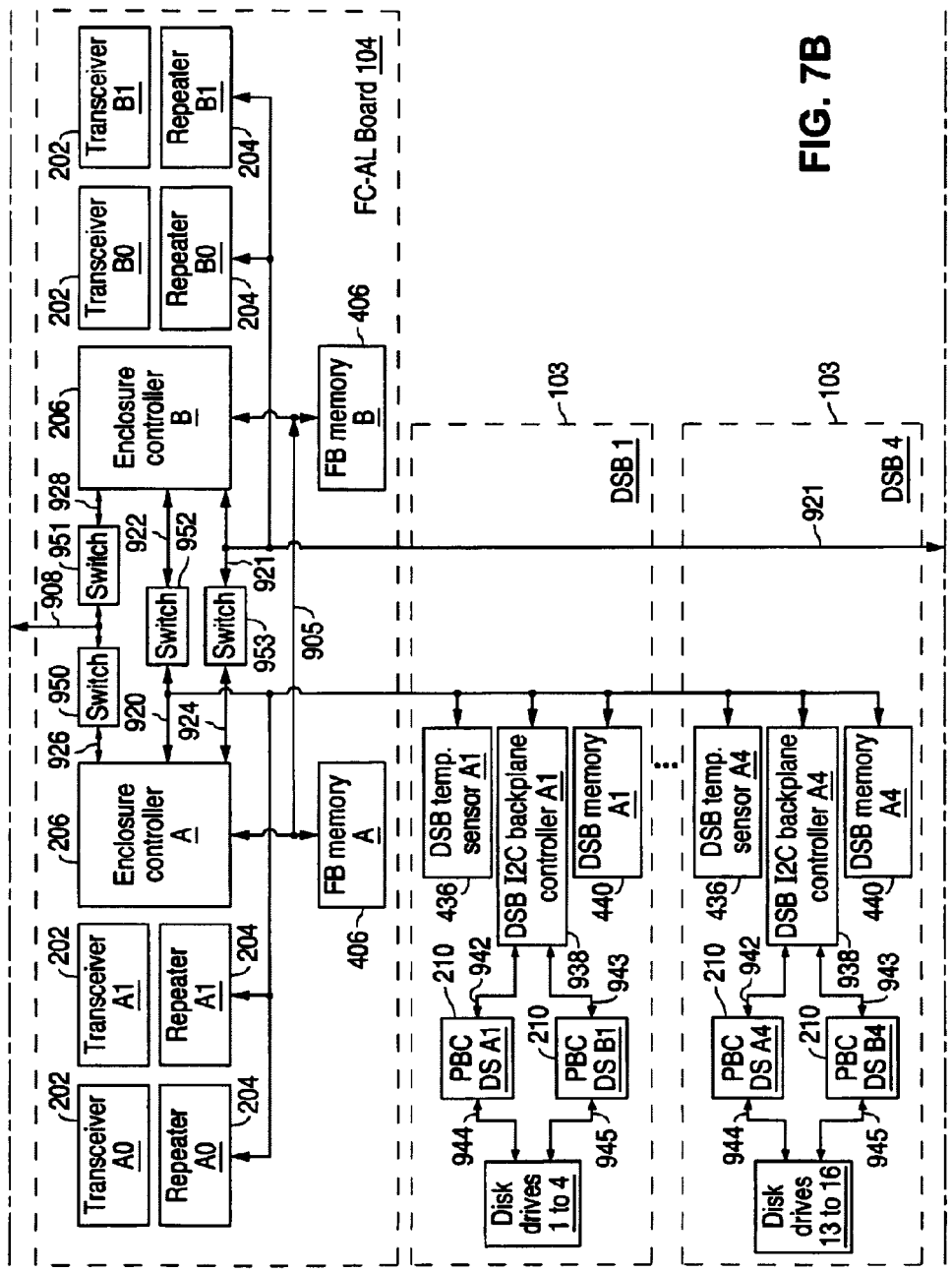
Figure 7C:
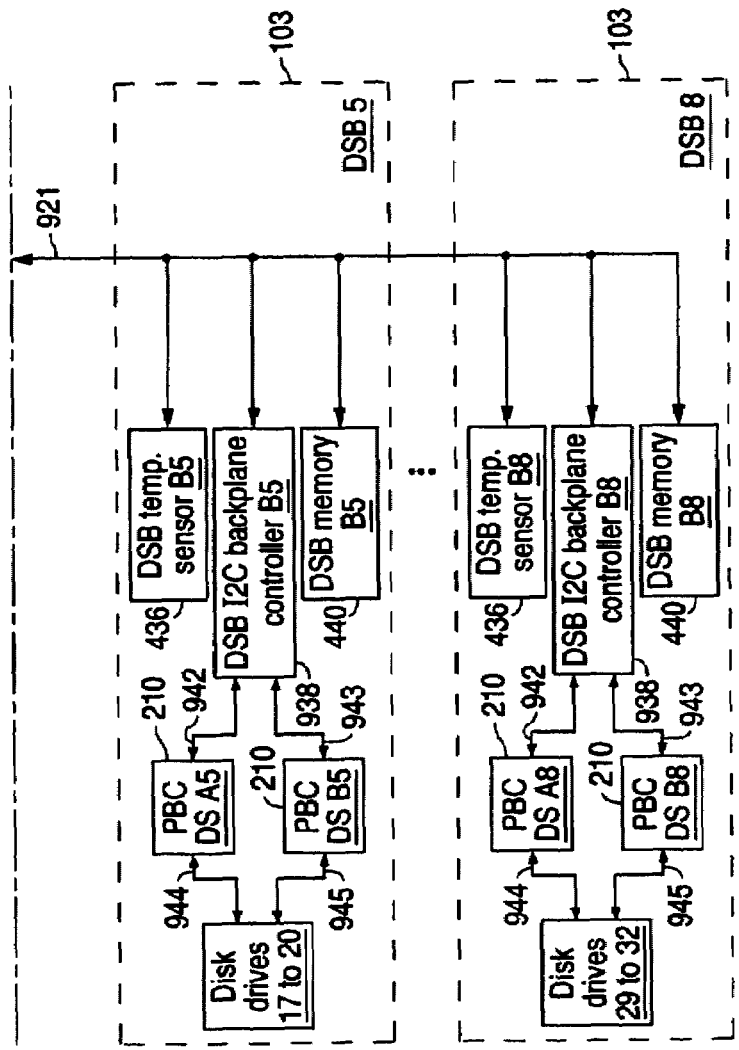

FIG. 7 (comprising of FIGS. 7A, 7B, and 7C) illustrates another embodiment of disk enclosure 102. FIG. 7 is a block diagram of midplane board 106, a FC-AL board 104, and a plurality of disk sled boards 103 (separately labeled DSB1 to DSB8), according to an embodiment of the present invention. In this embodiment, enclosure controller A accesses FB memory A via I2C bus 905. Enclosure controller A controls and/or monitors repeaters A0 and A1 via an I2C bus 920. I2C bus 920 is also coupled to I2C elements on DSB1 to DSB4. Specifically, I2C bus 920 is coupled to (1) DSB temp. sensor A1, DSB I2C backplane controller A1, and DSB memory A1 on DSB1, (2) DSB temp. sensor A2, DSB I2C backplane controller A2, and DSB memory A2 on DSB2, (3) DSB temp. sensor A3, DSB I2C backplane controller A3, and DSB memory A3 on DSB3, and (4) DSB temp. sensor A4, DSB I2C backplane controller A4, and DSB memory A4 on DSB4. DSB I2C backplane controllers A1 to A4 are respectively coupled to PBCs DS A1 to DS A4 via respective I/O lines 942. PBCs DS A1 to DS A4 are respectively coupled to disk drives DD1 to DD4, DD5 to DD8, DD9 to DD12, and DD13 to DD16 via respective I/O lines 944. Enclosure controller A controls and/or monitors PBCs DS A1 to DS A4 (and thus disk drives DD1 to DD16) via DSB I2C backplane controllers A1 to A4.

I2C bus 920-A is further coupled via a switch 952 to an I2C bus 922 of enclosure controller B so enclosure controller B can also access I2C elements on DSB1 to DSB4. As FIG. 7 illustrates, DSB I2C backplane controllers A1 to A4 are also respectively coupled to PBCs DS B1 to DS B4 via respective I/O lines 943. PBCs DS B1 to DS B4 are respectively coupled to disk drives DD1 to DD4, DD5 to DD8, DD9 to DD12, and DD13 to DD16 via respective I/O lines 945. Enclosure controller B controls and/or monitors PBCs DS B1 to DS B4 (and thus disk drives DD1 to DD16) via DSB I2C backplane controllers A1 to A4. For clarity, only DSB1 and DSB4 are illustrated in FIG. 7.

Figure 8:
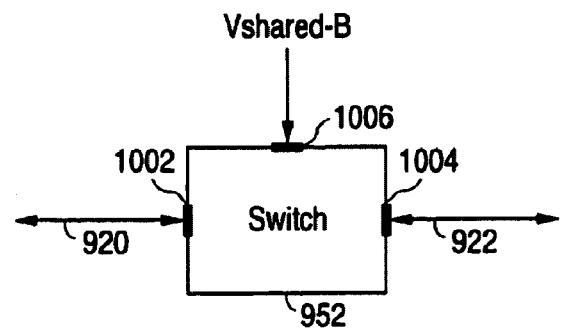
FIGS. 8, 9, and 10 are block diagrams of switches of the FC-AL board of FIG. 7, according to embodiments of the present invention.

FIG. 8 illustrates a switch 952 in one embodiment. Switch 952 has (1) data input/output terminals 1002 coupled to I2C bus 920, (2) data input/output terminals 1004 coupled to I2C bus 922, and (3) an enable terminal 1006 coupled to voltage Vshared-B supplied by a voltage circuit 1302 shown in FIG. 7 and labeled as voltage circuit B on midplane board 106. This voltage circuit 1302 can be the same as the previously described voltage circuits 402. The voltage circuits 1302 supplies Vshared-B to loop B elements on FC-AL board 104 (e.g., enclosure controller B) and midplane board 106.

Switch 952 couples I2C bus 920 with I2C bus 922 when Vshared-B is high. Switch 952 de-couples I2C bus 920 from I2C bus 922 when Vshared-B is low (e.g., falls below a predetermined threshold or becomes grounded). Thus, I2C bus 920 is not pulled to ground when I2C bus 922 is grounded by a failure of voltage circuit B. Accordingly, enclosure controller A can continue to monitor I2C elements on DSB1 to DSB4 when I2C bus 922 is grounded by a failure of voltage circuit 1302-B. Switch 952 is powered by Vshared-A supplied by a voltage circuit 1302 shown in FIG. 7 and labeled as voltage circuit A. Voltage circuit 1302 can be the same as the previously described voltage circuits 402. Voltage circuit A supplies voltage Vshared-A to loop A elements on FC-AL board 104 (e.g., enclosure controller A) and midplane board 106. Switch 952 is, for example, a SN74HC4066 Quadruple Bilateral Analog Switch from Texas Instrument.

Referring back to FIG. 7, enclosure controller B controls and/or monitors repeaters B0 and B1 via an I2C bus 921. I2C bus 921 is also further coupled to I2C elements on DSB5 to DSB8. Specifically, I2C bus 921 is coupled to (1) DSB temp. sensor B5, DSB I2C backplane controller B5, and DSB memory B5 on DSB5, (2) DSB temp. sensor B6, DSB I2C backplane controller B6, and DSB memory B6 on DSB6, (3) DSB temp. sensor B7, DSB I2C backplane controller B7, and DSB memory B7 on DSB7, and (4) DSB temp. sensor B8, DSB I2C backplane controller B8, and DSB memory B8 on DSB8. DSB I2C backplane controllers B5 to B8 are respectively coupled to PBCs DS B5 to DS B8 via respective I/O lines 943. PBCs DS B5 to DS B8 are respectively coupled to disk drives DD17 to DD20, DD21 to DD24, DD25 to DD28, and DD29 to DD32 via respective I/O lines 945. Enclosure controller B controls and/or monitors PBCs DS B5 to DS B4 (and thus disk drives DD17 to DD32) via DSB I2C backplane controllers B5 to B8.

I2C bus 921 is further coupled via a switch 953 to an I2C bus 924, which is connected to enclosure controller A. Thus, enclosure controller A can also access I2C elements on DSB5 to DSB8. As FIG. 7 illustrates, DSB I2C backplane controllers B5 to B8 are also respectively coupled to PBCs DS A5 to DS A8 via respective I/O lines 942. PBCs DS A5 to DS A8 are respectively coupled to disk drives DD17 to DD20, DD21 to DD24, DD25 to DD28, and DD29 to DD32 via I/O lines 944. Enclosure controller A controls and/or monitors PBCs DS A5 to DS A8 (and thus disk drives DD17 to DD32) via DSB I2C backplane controllers B5 to B8. For clarity, only DSB5 and DSB8 are illustrated in FIG. 7.

Figure 9:
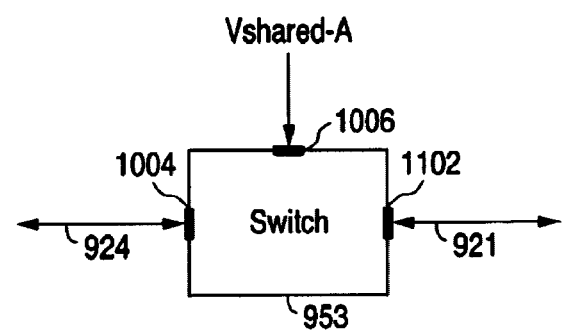

FIG. 9 illustrates switch 953 in one embodiment. Switch 953 has (1) data input/output terminals 1102 coupled to I2C bus 921, (2) data input/output terminals 1104 coupled to I2C bus 924, and (3) an enable terminal 1106 coupled to voltage Vshared-A supplied by voltage circuit A. Switch 953 couples I2C bus 921 with I2C bus 924 when Vshared-A is high. Switch 953 de-couples I2C bus 921 from I2C bus 924 when Vshared-A is low (e.g., falls below a predetermined threshold or becomes grounded). Thus, I2C bus 921 is not pulled to ground when I2C bus 924 is grounded by a failure of voltage circuit 1302. Accordingly, enclosure controller B can continue to monitor I2C devices on DSB5 to DSB8 when I2C bus 924 is grounded by a failure of voltage circuit A. Switch 951 is powered by Vshared-B supplied by power voltage circuit B. Switch 953 is of the same type as switch 952-A.

Referring back to FIG. 7, enclosure controller A is coupled via an I2C bus 926 to a switch 950 (described later). I2C bus 926 is coupled via switch 950 to an I2C bus 908. Similarly, enclosure controller B is coupled via an I2C bus 928 to a switch 951 (described later). I2C bus 928 is coupled via switch 951 to I2C bus 908. I2C bus 908 is coupled to I2C elements on midplane board 106.

Figure 10:
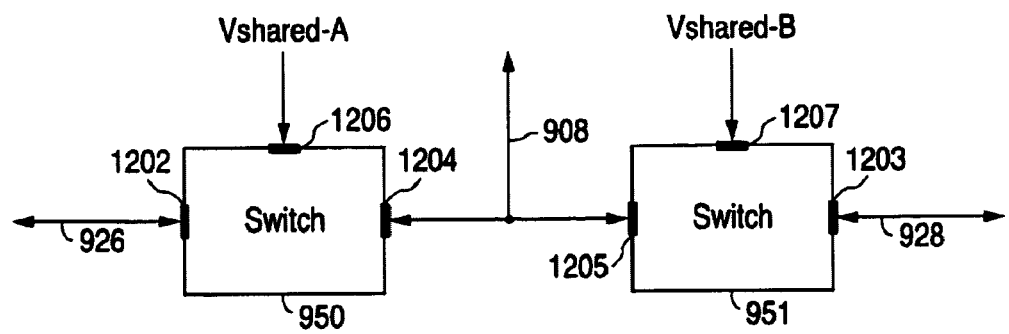

FIG. 10 illustrates switches 950 and 951 in some embodiments. Switch 950 has (1) data input/output terminals 1202 coupled to I2C bus 926, (2) data input/output terminals 1204 coupled to I2C bus 908, and (3) an enable terminal 1206 coupled to voltage Vshared-A supplied by voltage circuit A. Switch 950 couples I2C bus 926 with I2C bus 908 when Vshared-A is high. Switch 950 de-couples I2C bus 926 from I2C bus 908 when Vshared-A is low (e.g., falls below a predetermined threshold or becomes grounded). Thus, I2C bus 908 is not pulled to the ground when I2C bus 926 is grounded by a failure of voltage circuit A. Accordingly, enclosure controller B can continue to monitor I2C devices on midplane 906 when I2C bus 924 is grounded by a failure of voltage circuit A. Switch 950 is powered by voltage Vshared-B supplied by voltage circuit B. Switch 950 is of the same type as switch 952.

Switch 951 has (1) data input/output terminals 1203 coupled to I2C bus 928, (2) data input/output terminals 1205 coupled to I2C bus 908, and (3) an enable terminal 1207 coupled to voltage Vshared-B supplied by voltage circuit B. Switch 951 couples I2C bus 928 with I2C bus 908 when Vshared-B is high. Switch 951 de-couples I2C bus 958 from I2C bus 908 when Vshared-B is low (e.g., grounded). Thus, I2C bus 908 is not pulled to the ground when I2C bus 928 is grounded by a failure of voltage circuit B. Accordingly, enclosure controller A can continue to monitor I2C devices on midplane 906 when I2C bus 928 is grounded by a failure of voltage circuit B. Switch 951 is powered by voltage Vshared-A supplied by voltage circuit A. Switch 951 is of the same type as switch 952.

Referring again to FIG. 7, midplane board 106 includes an MB I2C backplane controller 410, an MB memory 412, an MB temperature sensor 414, an I2C I/O expander 416, PBCs A and B, and the previously described voltage circuits 1302 (voltage circuits A and B). I2C bus 908 from FC-AL board 104 is coupled to MB I2C backplane controller 410, MB memory 412, MB temperature sensor 414, and I2C I/O expander 416. MB I2C backplane controller 410, MB memory 412, MB temperature sensor 414, and MB I2C I/O expander 416 are powered by either voltage circuit A or B.

MB I2C backplane controller 410 controls and/or monitors (1) PBC A via I/O lines 1322, and (2) PBC B via I/O lines 1324. PBC A is used to bypass any of PBCs DS A1 to DS A4 while PBC B is used to bypass any of PBCs DS B5 to DS B8. I2C I/O expander 416 is coupled to (1) fans FA0, FA1, FB0, and FB1 via I/O lines 1026, (2) power supplies A0, A1, B0, and B1 via I/O lines 1328, and (3) backup batteries BA0, BA1, BB0, and BB1 via I/O lines 1332 (through respective power supplies A0, A1, B0, and B1). Enclosure controllers A and B use I/O expander 416 to control and/or monitor the fans, the power supplies, and the backup batteries. In some embodiments, the functions of loop A elements and loop B elements illustrated in FIG. 7 are the same as the functions of the loop A elements and loop B elements illustrated in FIG. 4.

Although the invention has been described with reference to particular embodiments, the description is only an example of the invention's application and should not be taken as a limitation. Various other adaptations and combinations of features of the embodiments disclosed are within the scope of the invention as defined by the following claims.

I claim:

1. A disk enclosure comprising:
a first bus coupled to a first plurality of elements powered by a first power domain;
a second bus coupled to a second plurality of elements powered by a second power domain;
a first controller coupled to a third bus;
a first multiplexer operable to selectively couple the first or the second bus to the third bus so the first controller can communicate with the first or the second plurality of elements; and
wherein the first plurality of elements includes at least one of a first temperature sensor, a first memory, and a first backplane controller, the first backplane controller being coupled to a first port bypass circuit, and the first port bypass circuit being operable to bypass a first disk drive.

2. The disk enclosure of claim 1, wherein the second plurality of elements includes at least one of a second temperature sensor, a second memory, and a second backplane controller.

3. The disk enclosure of claim 2, wherein the second backplane controller is coupled to a second port bypass circuit, the second port bypass circuit is operable to bypass a second disk drive.

4. A disk enclosure comprising;
a first bus coupled to a first plurality of elements powered by a first power domain;
a second bus coupled to a second plurality of elements powered by a second power domain;
a first controller coupled to a third bus;
a first multiplexer operable to selectively couple the first or the second bus to the third bus so the first controller can communicate with the first or the second plurality of elements;
a fourth bus coupled to a third plurality of elements powered by the first power domain;
a fifth bus coupled to a fourth plurality of elements powered by the second power domain;
a second controller coupled to a sixth bus; and
a second multiplexer operable to selectively couple the fourth or the fifth bus to the sixth bus so the second controller can communicate with the third or the fourth plurality of elements.

5. The disk enclosure of claim 4, wherein:
the first plurality of elements includes at least one of a first temperature sensor, a first memory, and a first backplane controller;
the second plurality of elements includes at least one of a second temperature sensor, a second memory, and a second backplane controller;
the third plurality of elements includes at least one of a third temperature sensor, a third memory, and a third backplane controller; and
the fourth plurality of elements includes at least one of a fourth temperature sensor, a fourth memory, and a fourth backplane controller.

6. The disk enclosure of claim 5, wherein:
the first backplane controller is coupled to a first port bypass circuit, the first port bypass circuit operable to bypass a disk drive; and
the third backplane controller is coupled to a third port bypass circuit, the third port bypass circuit operable to bypass the disk drive.

7. A disk enclosure comprising:
a first bus coupled to a first plurality of elements powered by a first power domain;
a second bus coupled to a second plurality of elements powered by the first power domain;
a first controller coupled to a third bus;
a second controller coupled a fourth bus;
a first multiplexer operable to selectively couple the first and the third buses so the first controller can communicate with the first plurality of elements;
a second multiplexer operable to selectively couple the second and the fourth buses so the second controller can communicate with the second plurality of elements;
wherein:
the first plurality of elements includes a first backplane controller, the first backplane controller being coupled to a first port bypass circuit, the first port bypass circuit operable to bypass a first disk drive; and
the second plurality of elements includes a second backplane controller, the second backplane controller being coupled to a second port bypass circuit, the second port bypass circuit operable to bypass the first disk drive.

8. The disk enclosure of claim 7, further comprising:
a fifth bus coupled to a third plurality of elements powered by a second power domain;
a sixth bus coupled to a fourth plurality of elements powered by the second power domain;
wherein the first multiplexer is operable to selectively couple the first and the fifth buses so the first controller can communicate with the third plurality of elements; and
wherein the second multiplexer is operable to selectively couple the second and the sixth buses so the second controller can communicate with the fourth plurality of elements.

9. The disk enclosure of claim 8, wherein:
the third plurality of elements includes a third backplane controller, the third backplane controller being coupled to a third port bypass circuit, the first port bypass circuit operable to bypass a second disk drive; and
the fourth plurality of elements includes a fourth backplane controller, the fourth backplane controller being coupled to a fourth port bypass circuit, the second port bypass circuit operable to bypass the second disk drive.

* * * * *